Oct. 13, 1959     A. KIENAST     2,908,894
METER READING SYSTEM WITH PULSE TRAIN TRANSMITTERS
Filed June 22, 1953
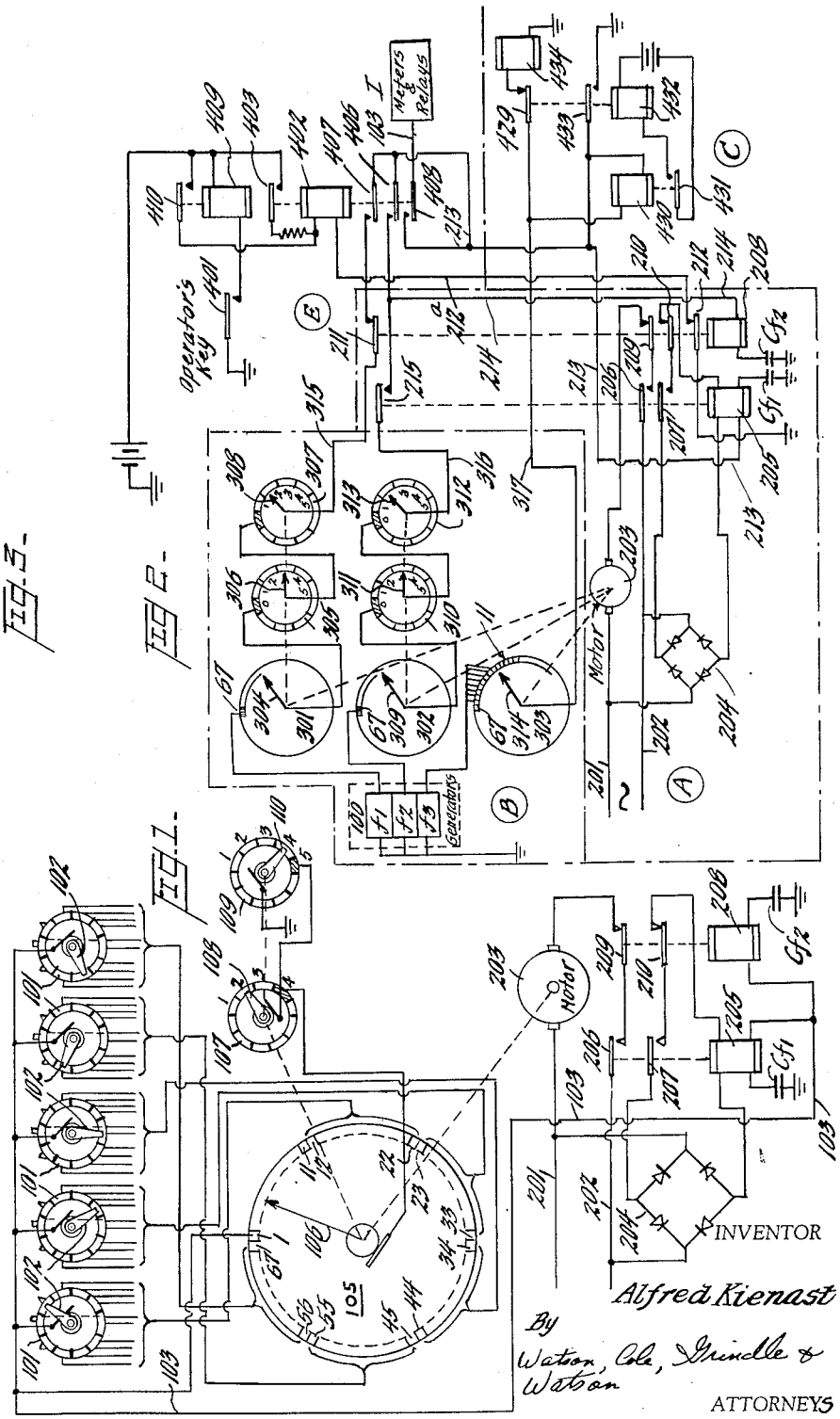
INVENTOR
Alfred Kienast
By
Watson, Cole, Grindle & Watson
ATTORNEYS

United States Patent Office 2,908,894
Patented Oct. 13, 1959

2,908,894

METER READING SYSTEM WITH PULSE TRAIN TRANSMITTERS

Alfred Kienast, Kusnacht, Zurich, Switzerland

Application June 22, 1953, Serial No. 363,225

Claims priority, application Switzerland, July 1, 1952

6 Claims. (Cl. 340—183)

This invention relates to the reading by electrical means of meters widely distributed at consumers' localities and recording of the result at a central station. The space for apparatus where the meters are installed is comparatively limited and it is an object of the invention that additonal apparatus must be small and a further object that access to both is unnecessary except for occasional control and not for reading purposes.

The method of the present invention is based on a system of time channels which are set up, synchronized and ordered in a sequence by synchronous motors one in the central station and one in each meter. Apart from the set up of this system of time channels no action by pulses of the like is needed. The time channels are open or closed circuits and the function of the central station consists in ascertaining which of them are open and which one closed and recording the result.

Figure 1 represents schematically the wiring in one of the meters to be read serving to set up those parts of the time channels connected with the positions of this one meter.

Fig. 2 is a circuit diagram of the arrangement at the central reading station.

Fig. 3 is part of a diagram which represents the reading.

Referring now in detail to the construction at a meter it is supposed that the meter is of the cyclometer counter type, having five numeral cylinders 101 of Fig. 1 each acting on the next by a Geneva movement type of gear, the first (from left) one of which registers the units of the measured quantity being turned by one tenth of the circumference each time one unit is completed. Each cylinder causes contact to be made successively at each of its ten positions and movement in steps of one tenth of the circumference in contrast to continuous movement is necessary so that exact contacts in the ten positions are guaranteed. Electromechanical constructions for the described arrangement for a meter are known. Furthermore the meter comprises a selector switch 105 with wiper 106 in Fig. 1 and 67 contacts. Its contact bank is divided in so many sections as there are numeral cylinders 101 in the meter in the present case six sections. One of the numeral cylinders is omitted to which reference see below. Now we have the following parts of time channels which in their entirety are described below. Circuit from line 103 to each of the wipers 102 in the numeral cylinders 101. Any of these wipers may contact with any of the ten contacts arranged on the cylinder to which the wiper belongs. Each of the ten contacts of the cylinder, f.i. the third from left which registers the hundreds, is connected to one contact of the bank 105 in the section corresponding to the numeral cylinder here containing the contacts 34–44 corresponding to the third cylinder from left. And the circuit is in this way to be traced from line 103 to the wiper 106 of the switch 105. Most of these circuits are open and only the very few are closed which correspond to those segments of the cylinders 101 on which the wipers 102 make contact and which represent the positions which the meter has attained.

Now it is at once seen that a cylinder 101 and its wiper 102 may be omitted and replaced by a fixed connection from line 103 to a contact on the bank of 105 as is shown in Fig. 1 to contact No. 1 on the bank of 105. Then this part of time channel is independent of the positions of the meter and may be used to indicate a number attached to the meter. Furthermore the bank of 105 does not only contain segments which correspond and are wired to segments of the cylinders 101; it may contain more segments for special purposes and in the Figure 1 there are in each section of the bank not only ten segments but eleven segments and the eleventh of them as indicated below is used in the central station to have a time interval in which relays may complete their task undisturbed.

For simplicity of the drawing the switch 105 has all its contacts on one bank. In reality the construction will be more elaborate; it is not necessary to dwell upon that here.

Furthermore there is in each meter a synchronous motor, 203 in Fig. 1, which rotates the wipers 106 of the switch 105 in such manner that the interval of time during which the wiper is in contact with the segment of the bank is longer than the interval in which the wiper jumps from one segment to the next. A mechanical construction by which this is attained is well known. All these motors in the different meters of a group are set in motion by a starting pulse from the central station through line 103 as described below; this pulse of frequency $f_1$ energizes relay 205 (in the meter) which closes its contacts 207 and 206. Contact 206 closed gives current from the main line 201, 202 to the motor 203 and contact 207 gives current from the main line rectified in 204 to hold the relay 205 in its energized position until a stopping pulse frequency $f_2$ arrives which energizes relay 208 (in the meter) and interrupts with contact 209 the current for the motor which stops and interrupts with contact 210 the holding current of relay 205 which releases. This done the motor 203 and the wiper of switch 105 are at rest.

Relay 205 and the adjoined condenser $Cf_1$ are in resonance with frequency $f_1$; likewise relay 208 and its adjoined condenser $Cf_2$ are in resonance with frequency $f_2$; this serves to distinguish these relays from other units connected to line 103 without moving contacts.

The wiper 106 of switch 105 jumping from contact to contact of the bank of 105 completes the parts of the time channels mentioned above from line 103 passing the wipers 102 of the counter and the wiring to the bank contacts of 105 and in so doing it orders these parts of the time channels into a definite sequence. As a last step these channels have to be terminated by connecting them to ground as will be described in the next few lines.

The conception of the invention is to unite in a group a number of meters connected in parallel to one line 103. The remaining parts of Fig. 1 symbolize the mechanism used in grouping together the time channels resulting from one meter with those from the other meters in the group, make from all of them one large sequence and connect them to ground.

To the switch 105 are joined further switches 107 with wiper 108, and 109 with wiper 110, each of ten contacts. The mechanical construction of this group with the help of Geneva movements is such that when wiper 106 has completed one cycle (of its 67 contacts) it moves the wiper 108 from its contact to the next contact and when wiper 108 has completed one cycle (of its ten contacts) it moves the wiper 110 from its contact to the next contact. Again as above the wipers jump from contact to contact so that neat electrical connections are obtained. The Geneva movement is the structural means to accomplish it and it is possible to have a spatially small unit. This is the mechanical side of the meter.

The wiring is the following. The time channels mentioned above have been followed up to the wiper 106. In each meter this wiper is connected electrically to one segment of the bank 107. In Fig. 1 it is segment 4. Then the wiper 108 is connected to one segment of bank 109. In Fig. 1 it is segment 5. And wiper 110 is connected to ground. This completes the time channels in the meter considered. We have the following:

When in the meter considered wiper 108 makes contact with segment 4 and at the same time wiper 110 makes contact with segment 5 then there exists a closed circuit from wiper 106 to ground, i.e. every one of the parts of the time channels considered above from line 103 to wiper 106 is now continued to ground. This changes when wiper 106 has completed its cycle and at the same time wiper 108 goes to the next contact as required. Then the connection to ground is broken and the set of parts of time channels up to wiper 106 just considered and having had connection to ground is replaced by the similar set in another meter i.e. that meter in which wipers 108 and 110 provide now the connection to ground.

It is obvious that each meter is characterized by a combination of two contacts one on bank 107 and the other on 109. There are one hundred such combinations different from one another and if the wipers 106 each in one of the one hundred meters driven by their respective synchronous motors 203 have made so many rotations that of the adjoined wipers 108 and 110 each has made contact once with every contact of the banks 107 and 109 respectively then the time channels in the one hundred meters are ordered in one large sequence each channel from line 103 to ground once complete some of them open and some of them closed circuits. This is the grand cycle of all the channels in the group of meters set up and synchronized by the movement of the motors 203.

It now remains to find out at the central station which of the channels are open and which of them are closed circuits. This is done by connecting to each of them in turn a source of electric current: if the circuit is closed a current will flow and if it is open there will be no current. An example of how to do this comprising the registration of it is shown in Fig. 2.

In the central station the equipment consists of four parts divided in the areas A, B, C, E by dotted lines. In A the synchronous motor 203 and its associated relays 205, 208 are shown analogous to the parts with the same numerals in Fig. 1. But here in the central station there are combined with them three more contacts 211, 212, 215 which will be described presently. The motor 203 when running turns the wipers 304, 309, 314 of the switches 301, 302, 303 shown in B. The two sets of switches 301, 305, 307 and 302, 310, 312 are constructed the same as are the sets 105, 107, 109 in Fig. 1. The switch 303 is the same equally with 67 contact segments as are 105 in Fig. 1 and 301, 302 in Fig. 2. Again the manner in which the drawing is set up has nothing to do with the mechanical construction and the principles for the latter are the same as those described above in relation to the set 105, 107, 109 as f.i. the two sets and 303 may be comprised mechanically in one unit. The set 301, 305, 307 responds to the starting pulse running along line 315, the set 302, 310, 312 responds to the stopping pulse running along 316 and the switch 303 controls the testing of the time channels as to their nature and all that will be described in more detail presently. The bank segments of switch 303 are connected to a current source $f3$; it is therefore advantageous to devise the construction in well known manner so that the current is interrupted during the small intervals when the wiper 314 jumps from one segment to the next; then there are no sparks at the contacts of 303.

Having run through one cycle and arrived at rest the wipers 106 Fig. 1, 304, 309, 314, Fig. 2, stay on contact No. 67 of the banks of the switches and each of the wipers 108, 110 in Fig. 1, 306, 308, 311, 313 in Fig. 2 stay on contact No. 0 of the respective banks. Since the sets 301, 303, 307 and 302, 310, 312 in Fig. 2 respond to starting and stopping pulses only all the other contacts of the sets 301, 303, 307 and 302, 310, 312 are nonconducting and this one position which has conducting segments will be called the position 67:0:0. This contact No. 67 of 301 is connected to a source of current of frequency $f1$ and contact 67 of 302 is connected to a source of current of frequency $f2$ and both these sources are connected to ground as shown in block 100 of B.

The scanning mechanism at the central station is shown in block B and comprises three rotary scanning switches 301, 302 and 303, all driven by the motor 203 in synchronism with the scanning switches 105 of the meters. These are connected to pulse generators 100, generating respectively a starting signal at frequency $f1$, a stopping signal at frequency $f2$ and a reading signal at frequency $f3$. Each of the switches 301, 302 and 303 has 67 contacts, as in the case of the scanning switch 105 on the meters. The switch 303 passing the reading signal has all the contacts operative except contacts Nos. 11, 22, 33, 44, 55, 66 and 67, so as to deliver a sequence of voltage pulses for each digit with a gap between it and the sequence for the next digit. The switch 302 for the stopping signal is associated with a pair of switches 310 and 312 corresponding with the switches 107 and 109 at the meters and arranged so that when the switch 302 has completed one revolution the switch 310 is moved on one step, and when the latter has completed a revolution the switch 312 is moved on one step. Switches 302, 310 and 312 have only one operative contact. The starting switch 310 is associated with switches 305 and 307 precisely similar to the switches 310 and 312 and again these switches have only one operative contact. Accordingly, the starting and stopping signals can only be transmitted at one of the 6700 positions of these switches, namely, the position, which may be referred to as the 67:0:0 position, corresponding to the beginning and end of the scanning cycle.

The parts in E serve to start the cycle of the time channels and stop it as follows. An operator closes contact 401 for a short time giving current to relay 409 which closes its contact 410 connecting current to relay 402 to be traced from ground to contact 212 of relay 208 in A through line 212a to relay 402 and contact 410 to battery. Relay 402 closes its contact 403 providing holding current to itself. It closes furthermore its contact 406 connecting line 316 to line 213, its contact 407 connecting line 315 to line 213 and its contact 408 connecting line 213 to the line $103^I$ going to one (I) of the groups of relays. This has the following effect. Since the wipers 304, 306, 308 stay on the position 67:0:0 contact 407 closing completes a path of current to be traced from ground to source of frequency $f1$ to position 67:0:0 on 301, 305, 307 to line 315 contact 211 now closed to 407, to line 213, relay 205 and its condenser $Cf_1$ which is energized and to ground. This path of current moreover extends from 213 and contact 408 now closed to line $103^I$ to the group of meters I which are connected in parallel and energizes there all the delays 205 (Fig. 1) as described above. Therefore all the start relays 205 in the central station and in every meter of the group I are energized at the same time, their contacts 206 provide current to the synchronous motors which all begin to turn and carry the wipers 106 in each meter of the group and the wipers 304, 309, 314 in Fig. 2 over the segments of the different banks. In this manner the sequence of time channels is produced each of these to be traced from ground and passing the source of frequency $f3$ to one segment of the bank 303, to the wiper 314 and line 317, to relay 430 and line 213, to contact 408 now closed and line $103^I$ to the group I of meters where it meets the one of the parts described above and connected to the segment of bank 105 which has the same number as the segment on bank 303 with which the wiper 314 is in contact at this moment. Wipers 314 and 106 turn synchronously as described and contact in every moment with the segment of the corresponding bank having the same number. Connected to the counting wheels in every meter there are according to the above description 67 possible parts of channel; in a group of meters there are 100 possible channels and there are therefore 6700 parts of time channels. This is a very large number to obtain perfect synchronism even if a comparatively large interval of time is accorded to each channel. There exist means to improve on the resulting behaviour of the mechanism in respect to synchronism and it seems not necessary to describe that here.

One more remark is necessary. When contact 407 closes contact 211 is closed and a starting pulse frequency $f1$ will flow immediately line 213 energizing all relays 205. Then these relays start the motors 203 and relay 205 in the central station closes its contact 215 which gives access over line 316, contact 406 to line 213 and contact 408 to line $103^I$ to the group of meters for a pulse frequency $f2$ over position 67:0:0 of banks 302, 310, 312 over lines 316 and 214 which tends to energize the relays 208 that is to counteract the starting pulse. In the meantime the motor 203 has started to turn wiper 309 and if this wiper quits segment 67 of bank 302 the pulse just mentioned to relay 208 stops. It must be arranged that the time during which this undesired pulse is flowing is so short, that the relays 208 are not energized.

When the sequence of time channels has run through its cycle the wipers 309, 311, 313 have arrived on the position just preceding 67:0:0 that is with the wipers on segment 66 which is not conducting as described in connection with bank 105 of Fig. 1. And when now in terminating wiper 309 steps on to segment 67 a current frequency $f2$ finds its way on line 316 contact 215 now closed and line 214 to relay 208 its associated condenser $Cf_2$ and ground. Furthermore it passes contact 406 still closed to line 213 and contact 408 to line $103^I$ and to all the meters of the group and in each meter to relay 208 its condenser $Cf_2$ and ground. Relay 205 with its condenser $Cf_1$ offers a large resistance to this current and is not energized. All the relays 208 in the central station and in all the meters of the group are energized, open their contact 209 whereby the motors 203 stop. Relay 208 in the central station opens its contact 211 preventing a current frequency $f1$ from position 67:0:0 and furthermore opens its contact 212 interrupting the holding current of relay 402, which releases opening contacts 406, 407 and 408. When relay 208 is energized it also opens its contact 210 thereby stopping the holding current of 205. The arrangement is again at rest.

It remains to describe the parts in C serving to register the result of the testing of the time channels. Suppose that wiper 314 stands on a conducting segment of 303, therefore excepting the segments 11, 22, 33 . . . 66 which are blank see explanation to bank 105, Fig. 1; suppose furthermore that in the meter the corresponding part of the time channel is an open circuit; therefore a current from line 317 passing relay 430 continuing on line 213 and contact 408 to the meter is impossible; the only way for this current is to energize relay 434. This subsists until wiper 314 reaches a segment such that the corresponding part of the time channel in the meter is closed; in that case the current from 314 not only energizes relay 434 it at the same time energizes relay 430 passing from 430 and the line 213 to contact 408 and line $103^I$ to the meters; then relay 430 closes its contact 431 connecting current to relay 432 which closes its contact 433 and opens 429 and relay 434 releases. If the following segment of 303 is conducting the current from 314 can no more energize 434, but it energizes 430 and passes contact 433 now closed to ground. This continues until wiper 314 meets a nonconducting segment. Then there is no current to energize relay 430. It drops its contact 431; relay 432 releases opening 433 and closing 429. Therefore contact 431 must hold on from one pulse to the next and open when there is a gap in the sequence of pulses from wiper 314. This shows the reason for the blank segments No. 11, 22, 33 . . . 66 of bank 105 which are mentioned above and on bank 303 the same segments are blank.

Since a current from line 213 or line 214 may arrive at one or the other of the relays 430, 434 it is necessary that these two relays respond only to current of frequency $f3$. After ten conducting segments corresponding to the ten possible positions of a counter wheel 101 Fig. 1 there is one nonconducting segment No. 11, 22 . . . 66 and in the time interval corresponding to it the relays 430, 432 and their contacts restore to the original positions. In each period of ten conducting segments of banks 303 Fig. 2 and 105 Fig. 1 relay 434 is energized so many times as the position of the wiper 102 on the corresponding counter wheel 101 Fig. 1 is indicating. Means to transfer this message appearing on relay 434 to printed form are known.

Fig. 3 shows a section of the time-diagram representing the presence and absence of current at the relay 430, 432, 434 and at certain points of the time channels which come into operation for the meter represented in Fig. 1 by the wipers 102 and from left to right at the contacts No. 1, 1, 4, 5, 8, 7 (the first 1 referring to the fixed connection to segment No. 1 on 105). From left to right of Fig. 3 there are shown time intervals of equal length. The first line refers to the segments 66, 67, 1, 2 . . . up to 66, 67, 1 of bank 303. It shows the blank segments and the pulses interrupted during the jump of wiper 314 from one segment to the next. Relay 432 carries current uninterrupted from the closing of contact 431 up into the next blank segment; the last line refers to it. At the banks 101 for the wiper 106 there is exactly one interval carrying current in every set of ten intervals; that is the second line. The remaining lines follow from what was described just preceding.

What is claimed is:

1. A single line multi-frequency time division system for remote reading of a register comprising at least a first and a second digit counter including a first and a second moving contact, one driven by each counter and each having a contact for each position of its associated counter, a single scanning mechanism having a first, a second and a third group of stationary contacts and a first, second and third moving contact operatively associated with each respective group of stationary contacts, each of said first group of stationary contacts being individually connected to one contact of said counter driven selector switches, means for continuously driving said first moving contact to scan all of said first group stationary contacts during each unit scanning cycle and serially to connect said second and said third moving contacts, during a group scanning cycle to said single line, the scanning mechanism, a second scanning mechanism located at a remote reading station, and a source of current, said second scanning mechanism comprising means for continuously driving said mechanism in synchronism with said single scanning mechanism whereby the time sequence of open and closed paths for said current in the unit scanning cycle indicates the position of said first and said second counters, said system including a plurality of transmitters for sending signals of different frequencies from said remote station over said single line and means associated with said single scanning mechanism for responding to signals from said plurality of transmitters selectively to start, read, and stop said single scanning mechanism.

2. A system according to claim 1 including stepping magnets for each moving contact of said single scanning mechanism, said stepping magnets being connected together and advancing one of said moving contacts by one position each time another of said moving contacts completes a cycle.

3. A single line time division system for remote reading of a group of registers, each register comprising at least two digit counters including individual selector switches, one selector switch driven by each counter and each selector switch having a separate contact for each position of its counter, a single scanning unit located at each register comprising a first scanning switch having one stationary contact individually connected to each selector contact and a first scanning contact for contacting each of said stationary contacts, a single drive means for each scanning unit and a second scanning switch located at said register and serially connected to said first scanning switch during a unit scanning cycle, said first scanning contact scanning all of its contacts during each unit scanning cycle, said second scanning contact scanning all of its contacts during a group scanning cycle, a reading circuit including a component at a remote reading station and said serially connected first and second scanning contacts and means for applying a reading voltage to said reading circuit, said second scanning switch also driven by said single drive means.

4. A single line multi-frequency time division system for remote meter reading of a group of meters each of said meters including a plurality of counters, each counter capable of occupying any one of a plurality of positions, each meter including a plurality of selector switches driven respectively by respective ones of the plurality of counters and having a contact position for each position of the respective counter, a first scanning mechanism located at each of said meters and having a first group of contacts, each individually connected to one of the contacts of the counter driven selector switches and a first wiper contact operatively associated with said first group of contacts, the reading cycle for each meter of said group defining a unit scanning cycle, the reading cycle for all meters in said group defining a group scanning cycle, said scanning mechanism also including a second and a third group of contacts and a second and a third wiper, each operatively associated with respective ones of said second and said third groups of contacts, only one contact of each of said second and said third groups being serially connected to said single line during the reading of said counter, said scanning mechanism further including a single drive means for driving said wipers to connect said first wiper to each of said first group of contacts of each of said meters during each and every unit scanning cycle and to connect said second and said third wipers to each of said second and said third groups of contacts respectively during a group scanning cycle, a second scanning mechanism located at a remote reading station including a drive means driven in synchronism with said single drive means, means for passing a current through said first and said second scanning mechanisms and said single line in series whereby the time sequence of open and closed paths for such current on said single line during the scanning cycle of one first wiper contact indicates the position of the counters operatively associated with said one first wiper contact.

5. A single line multi-frequency time division system according to claim 4 wherein said first, second and third wipers are mechanically connected together wherein said third wiper advances one step each time said second wiper completes a cycle and wherein said second wiper advances a step each time said first wiper completes a cycle so as to permit current flow in each scanning mechanism only during one unit scanning cycle of said group scanning cycle, said system further comprising means for transmitting a starting signal of one frequency from said remote station, means operatively associated with said single drive means for responding to said starting signal to begin the scanning cycle, means at said remote station for transmitting a reading signal, means at said remote station for transmitting a stopping signal and means operatively associated with said single drive means for responding to said reading and said stopping signals.

6. A single line time division system for remote reading of the position of a group of meters, the reading cycle for each meter of said group defining a unit scanning cycle, the reading cycle for all meters in said group defining a group scanning cycle each meter including a plurality of counters capable of occupying any one of a plurality of positions, a plurality of selector switches each driven by one of said counters and having a contact for each position of its respective counter, a scanning mechanism operatively associated with said plurality of selector switches and having a plurality of contacts each individually connected to one of the contacts of the counter driven selector switches, said scanning mechanism including a first and a second moving switch contact serially connected to ground during one unit scanning cycle of the group scanning cycle, and a single driving means operatively connected to said first and said second switch contacts for driving said first contact to scan all of said plurality of contacts of said scanning mechanism in a predetermined sequence during each and every unit scanning cycle of each meter of said group of meters, said system further including a circuit connecting each selector switch and each scanning mechanism, a reading scanning mechanism at a remote reading station, means for passing currents of a plurality of frequencies through said scanning mechanisms in series, whereby the time sequence of open and closed paths for said current during the scanning cycle indicates the position of each of said counters, and means at each said meter operatively associated with said single drive means for starting and stopping said single drive means in response to predetermined signals of different frequencies transmitted over said single line from said remote reading station to said counter, said reading station including means for driving said reading scanning mechanism in synchronism with each of said scanning mechanism of each of said meters.

References Cited in the file of this patent

UNITED STATES PATENTS

| | | |
|---|---|---|
| 1,849,827 | Fitzgerald | Mar. 15, 1932 |
| 1,902,465 | Pratt | Mar. 21, 1933 |
| 1,955,043 | Yates et al. | Apr. 17, 1934 |
| 2,111,352 | Blake et al. | Mar. 15, 1938 |
| 2,148,075 | Kiner | Feb. 21, 1939 |
| 2,165,892 | Green | July 11, 1939 |
| 2,207,743 | Larson et al. | July 16, 1940 |
| 2,283,070 | Leathers | May 12, 1942 |
| 2,285,819 | Leathers | June 9, 1942 |
| 2,344,254 | Leathers et al. | Mar. 14, 1944 |
| 2,381,920 | Miller | Aug. 14, 1945 |
| 2,591,617 | Savino | Apr. 1, 1952 |